United States Patent [19]

Corwin

[11] Patent Number: 4,792,921
[45] Date of Patent: Dec. 20, 1988

[54] NETWORK EVENT IDENTIFIERS

[75] Inventor: Daniel W. Corwin, Andover, Mass.

[73] Assignee: Wang Laboratories, Inc., Lowell, Mass.

[21] Appl. No.: 841,070

[22] Filed: Mar. 18, 1986

[51] Int. Cl.⁴ .......................... G06F 5/00; G06F 7/08; G06F 7/10; G06F 7/28
[52] U.S. Cl. ..................................................... 364/900
[58] Field of Search ... 364/200 MS File, 300 MS File, 364/900 MS File; 379/93

[56]           References Cited
           U.S. PATENT DOCUMENTS 4,558,413  12/1985  Schmidt et al. ................. 364/200

OTHER PUBLICATIONS

Holzner, S. "Chapter 5, The Disk in Your PC,", In Creating Utilities With Assembly Language, (New York, Brady Communications Company, Inc., 1986), pp. 43–44.
Norton, P. "Chapter 5/An Overview of Elementary Commands", In: PC-DOS, Introduction to High Performance Computing, (Bowie, Maryland, Brady Communications Company, Inc., 1985), p. 42.
Crabtree, R. P., "Qualification of Network Name With Job Name"and "Multi-Level Network Name", and "Software Serial Number." IBM Technical Disclosure Bulletin, vol. 26, No. 7B, (Dec. 1983), pp. 3915–3919.

Primary Examiner—Raulfe B. Zache
Assistant Examiner—Robert B. Harrell
Attorney, Agent, or Firm—Michael H. Shanahan; Kenneth L. Milik

[57]           ABSTRACT

Identifiers for events occurring at a network node are generated responsive to the time of the event, to a telephone number associated with the node, and to an event characteristic. In a network all of whose nodes use this method, an identifier can be generated at one node without reference to any other node, which will be unique over the network. An identifier generated by this method can be decomposed to recover the time of the event, the telephone number associated with the node at which the event occurred at the time of occurrence, or the event characteristic.

3 Claims, 1 Drawing Sheet

NETWORK EVENT IDENTIFIERS

FIELD OF THE INVENTION

This invention relates to the operation of data processing nodes connected in a network to comprise a data processing system, and particularly to the generation of identifiers for events such as file creation, for use in the network.

DESCRIPTION OF THE RELATED ART

When a file is created at a stand-alone data processing device, in some such devices an identifier is automatically assigned by the device, while in others the user may assign any identifier he chooses to the file (within the device file-naming conventions), so long as the identifier is unique among the identifiers in use at the device. It is usual to provide at the device means for comparing a newly assigned identifier with those already in use, and to reject an identifier that is found to be identical which one in use. Generally, such means can search only identifiers in current use, not those of files which have been deleted or archived. It is therefore possible for a file identifier to be used to identify more than one file over a period of time.

When the device is a node in a data processing network, problems in identifying files may arise from several sources. Nodes in a network may be independently designed devices, each of which has its own local file naming convention. It is difficult to change these conventions after the devices are in use. When such devices are connected in a network, the different conventions introduce difficulties of communication between devices. A plurality of file-naming rules make cross-node file references by file name awkward or even impossible in the general case. Because of this difficulty, if it is necessary to share the data content of a file across nodes, the file may have to be copied in its entirety, renamed, and stored locally. This is inefficient. Further, if one copy is changed locally, inconsistencies arise between the versions.

Global file naming conventions can solve many of these problems. One method that is used to provide unique file identifiers is to refer to a central catalog or master memory in the system; however, in distributed networks there is no defined "central" location for this name-management facility. Even if one node is arbitrarily chosen for this purpose, it may not be accessible to all other nodes at all times during their operation.

For example, when the "central" node is temporarily down, the other nodes on the network will be unable to refer to it in order to assign unique file identifiers. Alternatively, if a node is temporarily disconnected from the network, it cannot refer to the central node in order to verify a file identifier.

SUMMARY OF THE INVENTION

It is therefore desirable to provide a method and means for providing event (such as file creation) identifiers that ensure that each identifier is unique over a network of nodes. It is further desirable that such a method and means be operable entirely within a single node, whether or not the node is connected into the network at the time of the event.

It is an object of the present invention to provide such method and means for generating unique event identifiers that do not require reference or physical link to any shared central naming facility or catalog.

It is a further object of the present invention to provide method and means for generating unique event identifiers providing information about the time and place of the identified event, as well as information about the nature of the event.

According to a first aspect of the invention, there is provided, in the operation of a data processing node at which successive qualifying events can occur at time intervals no smaller than x, a method of generating a unique event identifier signal for a qualifying event, comprising the steps: providing and storing call number signals representing the call number of a telephone terminal associated with the node; providing time signals indicative of distinctly denominated times, any two successive denominated times being separated by a time interval smaller then x; providing an event signal responsive to occurrence of a qualifying event; generating, responsive to the event signal, to the stored call number signals and to the time signals indicative of a denominated time most closely associated with the time of provision of the event signal, an identifier signal associated with the event; and storing the identifier signal.

In preferred embodiments, the event signal is also responsive to a characteristic of the event, and the identifier signal is indicative of the the event characteristic. Desirably, a plurality of such nodes are connected together in a network.

According to another aspect of my invention, there is provided in a data processing node, at which successive qualifying events can occur at any node at time intervals no smaller than x, identifier means for generating a unique identifier signal for any qualifying event. The identifier means comprises storage means; call number means for providing and storing in the storage means signals representing the call number of a telephone terminal associated with the node; time signal means for providing time signals indicative of distinctly denominated times, any two successive denominated times being separated by a time interval smaller than x; event signal means responsive to occurrence of a qualifying event for providing an event signal; and generating means responsive to an event signal, to the stored call number signals and to the time signals indicative of a denominated time most closely associated with the time of provision of the event signal, for generating an identifier signal associated with the event, and for storing the identifier signal in the storage means.

In preferred embodiments, the event signal means is also responsive to a characteristic of the event for providing the event signal, and the generated identifier signal is indicative of the event characteristic. There is also provided analysis means comprising first decomposing means responsive to a generated event identifier signal for generating time signals indicative of the denominated time most closely associated with the time of occurrence of the event identified by the identifier signal; second decomposing means responsive to a generated event identifier signal for generating call number signals representing the call number of the telephone terminal associated, at the time of occurrence of the identified event, with the node at which the event identifier signal was generated; and third decomposing means responsive to a generated event identifier signal for generating event characteristic signals indicative of the characteristic of the identified event.

These and other objects, features and advantages of the present invention will appear from the following description of a preferred embodiment, together with the drawing, in which

DESCRIPTION OF THE PREFERRED EMBODIMENT

Figure 1:
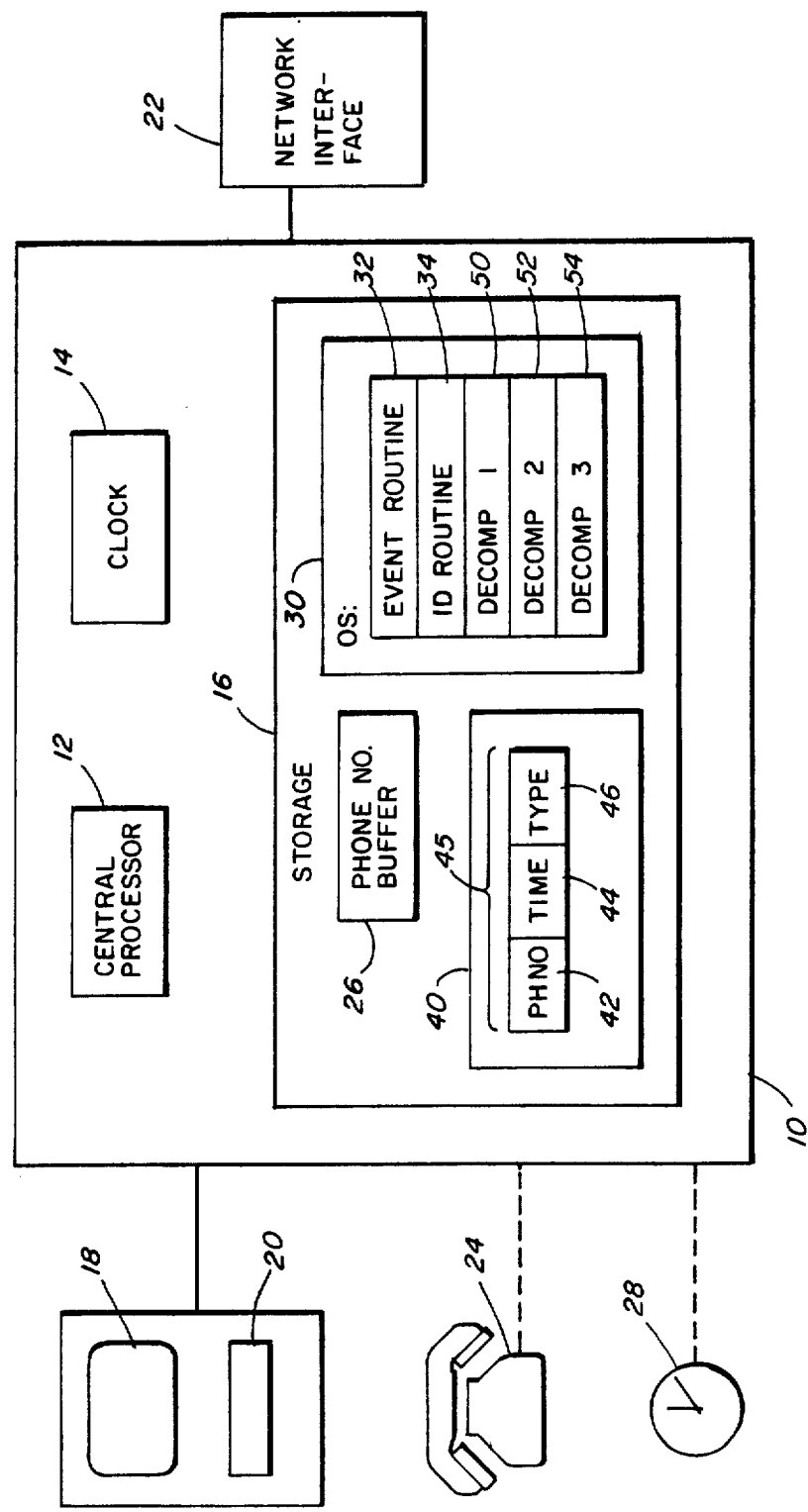
FIG. 1 is a schematic showing of a node in which the present invention is practiced.

Referring now to the drawing, a data processing device 10 comprises a central processing unit 12, an internal clock 14, and storage 16. Input/output means conventionally comprising a display 18 and keyboard 20 is provided. A network interface 22, which may be a modem or other appropriate means, connects the device into a network. A telephone terminal 24 is associated with device 10. Terminal 24 may be a handset or other type of terminal having a unique call number. Terminal 24 need not be physically connected with device 10; its call number is stored in buffer 26 either by being entered through keyboard 20 or in any other convenient way. A real-time clock 28 is associated with a device 10; the time shown by this clock is used to provide a fiduciary time for the internal clock 14. This fiduciary time may be entered through keyboard 20 or in any other convenient way.

As is well understood in the art, central processor 12 operates according to an operating system program 30, stored in storage 16, to manage the data processing and other activities of the device.

According to the present invention, an event routine 32 is provided in operating system program 30. Designers of higher level programming for the device select certain events as qualifying events, that is, events for which it is desired to provide an identifier. Such events may be, for example, file creation, keyboard input, or logging on or off. Provision is made for calling event routine 32 upon occurrence of such a qualifying event. Device 10, under the control of event routine 32, generates an event signal, which desirably represents a characteristic of the event, that is, its type or class. Qualifying events are assumed to occur of device 10 at time intervals having a minimum size of x seconds.

Clock 14 provides time signals indicative of distinctly denominated times; any two successive denominated times are separated by a time interval smaller than x. Typically, successive denominated times are separated by 1/20 second, of the order of conventional disk access time.

An identifier routine 34 is provided in operating system 30. This routine responds to the event signal by referring to the call number buffer 26 and to clock 14, and generates responsive to the event signal, to the stored call number signals and to the time signals from clock 14, an identifier signal associated with the event. This identifier signal is stored, for example at 45 in file index 40 (in storage 16) or wherever a file identifier is conventionally used.

The identifier is desirably in the form of a Node field 42, comprising signals representing the call number from buffer 26, a Time field 44, comprising time signals from clock 14 indicative of a denominated time most closely associated with the time of the event signal, and a Type field 46, comprising signals indicative of the type of event (event characteristic). These signals may be packed or concatenated in ay convenient way.

I estimate that an identifier format comprising 16 bytes is adequate to conveniently and unambiguously described at least 1000 events per second at each phone number in the world for at least the next 1000 years. File catalog systems on most current computer systems support file names of at least 16 bytes, so the identifier generated according to the present invention can be adopted within the framework of most existing file naming and cataloging methods. In a network of nodes in which my invention is employed, a file identifier generated according to my invention is unique among all identifiers generated in the network at any time, not merely among those catalogued or indexed at the time of generation. Thus even archived and deleted files remain uniquely identified.

An identifier generated according to the present invention can be used by any node in the system, which can therefore access the identified file without further information if the nodes are connected through the global telephone network.

Events or objects other than file creation that may desirably be identified according to my invention are creation or change of any network node, a hardware component in the node, the person or organization typically using the node, or transient data structures.

According to a futher aspect of my invention, an identifier generated according to my invention can be analyzed to derive information that is useful in accessing the identified file or otherwise. For this purpose, three decomposition routines are provided in operating system 30. Decomposition routine 50 generates, in response to a provided identifier generated as described above, the call number of the telephone terminal that was associated, at the time of the event, with the node where the event occurred. This information is useful, if the identified file has been archived but is not longer stored in the node; a telephone call to the derived call number is likely to reach an operator who can provide the identified file. Furthermore, call forwarding information can be provided at the node if the associated telephone terminal has been changed. Decomposition routine 52 generates, in response to a provided identifier generated as described above, the denominated time closest to the time when the event occurred. This information is frequently desired by users of data processing devices. Finally, decomposition routine 54 generates, in response to a provided identifier generated as described above, signals representing the characteristic or type of the event. This information is useful in the internal operation of the device; for example, a program branch can be conditioned on the event characteristic.

What is claimed is:

1. In a data processing node, at which successive qualifying events can occur at time intervals no smaller than x, an improvement comprising:
    identifier means for generating a unique identifier signal for a qualifying event having a characteristic, comprising
    storage means,
        node number means for providing signals representing a predetermined number, and storing said signals in said storage means
        time signal means for providing time signals indicative of distinctly denominated times, any two successive denominated times being separated by a time interval smaller than x, event signal means responsive to occurrence of one of said qualifying events and to a characteristic of said one event for provding an event signal, generating means connected to said storage means, said time signal means, and said event signal means and responsive to a said event signal, to said stored node number signals and to said time signals indicative of the one of said denominated times minimally distant from the time of provision of said event signal, for generating an identifier signal associated with said event and indicative of said event characteristic, and for storing said identifier signal in said storage, identifier signal presenting means comprising input/output means and network interface means, analysis means responsive to a previously generated event identifier signal presented at said identifier presenting means, comprising first decomposing means for generating node number signals representing the node number stored, at the time of occurrence of the event identified by said presented identifier signal, at the node at which said presented event identifier signal was generated, second decomposing means for generating time signals indicative of the denominated time minimally distant from the time of occurrence of the event identified by said presented event identifier signal, and third decomposing means for generating event characteristic signals indicative of a characteristic of the event identified by said presented event identifier signal.

2. In a network of data processing nodes, at each of which successive qualifying events can occur at time intervals no smaller than x, an improvement comprising:

at each said node, identifier means for generating a unique identifier signal for a qualifying event having a characteristic, comprising storage means, node number means for providing signals representing a predetermined number, and storing said signals in said storage means, time signal means for providing time signals indicative of distinctly denominated times, any two successive denominated times being separated by a time interval smaller than x, event signal means responsive to occurrence of one of said qualifying events and to a characteristic of said one event for providing an event signal, generating means connected to said storage means, said time signal means, and said event signal means and responsive to a said event signal, to said stored node number signals and to said time signals indicative of the one of said denominated times minimally distant from the time of provision of said event signal, for generating an identifier signal associated with said event and indicative of said event characteristic, and for storing said identifier signal in said storage, and in at least one said node, identifier signal presenting means, comprising input/output means and network interface means, for presenting a previously generated identifier signal, and analysis means for decomposing a said identifier signal presented at said identifier presenting means, comprising first decomposing means for generating node number signals stored, at the time of occurrence of the event identified by said presented identifier signal, at the node at which said presented event identifier signal was generated, second decomposing means for generating time signals indicative of the denominated time minimally distant from the time of occurrence of the event identified by said presented event identifier signal, and third decomposing means for generating event characteristic signals indicative of a characteristic of the event identified by said present event identifier signal.

3. The improvement of claim 1, further comprising fiduciary time means for relating said time signals to a real time standard.

* * * * *